United States Patent
Wang

(10) Patent No.: US 10,860,852 B2
(45) Date of Patent: Dec. 8, 2020

(54) EYE STATE DETECTING METHOD AND EYE STATE DETECTING SYSTEM

(71) Applicant: PixArt Imaging Inc., Hsin-Chu (TW)

(72) Inventor: Guo-Zhen Wang, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 158 days.

(21) Appl. No.: 15/985,632

(22) Filed: May 21, 2018

(65) Prior Publication Data
US 2018/0276447 A1    Sep. 27, 2018

Related U.S. Application Data

(63) Continuation of application No. 15/199,965, filed on Jun. 30, 2016, now Pat. No. 10,007,845.

(30) Foreign Application Priority Data

Jul. 6, 2015    (TW) .............................. 104121917 A
Jun. 2, 2016    (TW) .............................. 105117315 A

(51) Int. Cl.
G06K 9/00 (2006.01)
H04N 5/232 (2006.01)
G06F 3/01 (2006.01)
G02B 27/01 (2006.01)
G06F 3/00 (2006.01)
G02B 27/00 (2006.01)

(52) U.S. Cl.
CPC ....... G06K 9/0061 (2013.01); G02B 27/0093 (2013.01); G02B 27/017 (2013.01); G06F 3/005 (2013.01); G06F 3/013 (2013.01); G06F 3/017 (2013.01); G06K 9/00597 (2013.01); H04N 5/23219 (2013.01); H04N 5/23222 (2013.01); *G02B 2027/014* (2013.01); *G02B 2027/0138* (2013.01); *G02B 2027/0178* (2013.01)

(58) Field of Classification Search
CPC .......... H04N 5/23219; H04N 5/23222; G06K 9/00845; G06K 9/0061; G06K 9/00221; G06K 9/00281; G06K 9/6276; G06F 3/013; G06F 3/017; G06F 17/30247; G06F 3/00; G06F 3/005; G06F 3/012; G06F 3/04815; G02B 27/17
See application file for complete search history.

(56) References Cited

U.S. PATENT DOCUMENTS

| | | | |
|---|---|---|---|
| 5,801,763 A * | 9/1998 | Suzuki ................ | A61B 5/1176 340/439 |
| 5,878,156 A | 3/1999 | Okumura | |
| RE39,539 E * | 4/2007 | Torch .................. | A61B 3/0066 340/575 |

(Continued)

FOREIGN PATENT DOCUMENTS

| | | |
|---|---|---|
| CN | 101520842 A | 9/2009 |
| CN | 101930535 A | 12/2010 |

(Continued)

*Primary Examiner* — Jingge Wu
(74) *Attorney, Agent, or Firm* — Winston Hsu

(57) ABSTRACT

An eye state detecting method, which comprises: (a) capturing a detecting image; (b) computing a brightness variation tendency for a peripheral part of a darkest part of the detecting image; and (c) determining whether a user's eye is in an opening state or in a closing state according to the brightness variation tendency.

6 Claims, 9 Drawing Sheets

(56) References Cited

U.S. PATENT DOCUMENTS

| | | | |
|---|---|---|---|
| 9,201,512 B1* | 12/2015 | Raffle | G06F 3/033 |
| 9,207,760 B1* | 12/2015 | Wu | G06K 9/6263 |
| 2001/0009591 A1 | 7/2001 | Hiraishi | |
| 2004/0179716 A1 | 9/2004 | Tafuku | |
| 2005/0232461 A1 | 10/2005 | Hammoud | |
| 2006/0203088 A1 | 9/2006 | Hammoud | |
| 2008/0151186 A1 | 6/2008 | Adachi | |
| 2008/0226138 A1 | 9/2008 | Suzuki | |
| 2008/0252745 A1 | 10/2008 | Nakamura | |
| 2009/0003709 A1 | 1/2009 | Kaneda | |
| 2010/0073497 A1 | 3/2010 | Katsumata | |
| 2011/0115967 A1 | 5/2011 | Lee | |
| 2012/0269442 A1 | 10/2012 | Hermant-Santini | |
| 2013/0222642 A1 | 8/2013 | Watanabe | |
| 2013/0257709 A1* | 10/2013 | Raffle | G06F 3/013 345/156 |
| 2014/0078281 A1 | 3/2014 | Tsou | |
| 2014/0112580 A1 | 4/2014 | Hanita | |
| 2015/0186720 A1 | 7/2015 | Tsou | |
| 2016/0058158 A1* | 3/2016 | Tomita | H04N 5/23219 348/78 |
| 2017/0091955 A1 | 3/2017 | Nakai | |
| 2017/0160799 A1 | 6/2017 | Shi | |
| 2017/0316264 A1 | 11/2017 | Gustafsson | |

FOREIGN PATENT DOCUMENTS

| | | |
|---|---|---|
| CN | 103729646 A | 4/2014 |
| CN | 104463081 A | 3/2015 |
| EP | 2 096 577 A2 | 9/2009 |
| JP | 2001-229499 A | 8/2001 |
| TW | I432012 B | 3/2014 |
| WO | 2007/092512 A2 | 8/2007 |
| WO | 2007/092512 A3 | 4/2009 |

* cited by examiner

Eye open

Eye close

EYE STATE DETECTING METHOD AND EYE STATE DETECTING SYSTEM

CROSS REFERENCE TO RELATED APPLICATIONS

This application is a continuation of applicant's earlier application, Ser. No. 15/199,965, filed Jun. 30, 2016 and is included herein by reference.

BACKGROUND OF THE INVENTION

1. Field of the Invention

The present invention relates to an eye state detecting method and an eye state detecting system, and particularly relates to an eye state detecting method and an eye state detecting system which can determine an eye state via an image with a low resolution and a smaller determining range.

2. Description of the Prior Art

More and more electronic apparatuses have the function for detecting an eye opening state or an eye closing state. Such functions can remind the user his eye is close, to avoid the user's eye closes at an improper timing (ex. while taking a picture). Also, the user can accordingly control the electronic apparatus via opening eyes or closing eyes. Such electronic apparatus needs a detecting apparatus to detect the eye opening and the eye closing. One of the detecting methods is capturing images via an image sensor, and detecting whether the user opens his eye or closes his eye based on features of images.

However, images with high resolutions or larger determining ranges are needed if a proper determination for features of images is desired, thus the cost for the electronic apparatus rises, or more computing loading is needed, which causes higher power consumption. However, it is hard to identify the features of images if images with low resolutions are applied for detecting, thus it is hard to detect whether the user open his eye or close his eye.

SUMMARY OF THE INVENTION

One objective of the present invention is to provide a detecting method that can use an image with a low resolution to determine the eye state.

Another objective of the present invention is to provide a detecting system that can use an image with a low resolution to determine the eye state.

One embodiment of the present invention discloses an eye state detecting method, which comprises: (a) capturing a detecting image; (b) computing a brightness variation tendency for a peripheral part of a darkest part of the detecting image; and (c) determining whether a user's eye is in an opening state or in a closing state according to the brightness variation tendency.

Another embodiment of the present invention discloses an eye state detecting system, which comprises: a control circuit; an image sensor, wherein the control circuit controls the image sensor to capture a detecting image via a detecting range; and a computing circuit, configured to compute a brightness variation tendency for a peripheral part of a darkest part of the detecting image, and to determine whether the user's eye is in an opening state or in a closing state according to the brightness variation tendency.

Still another embodiment of the present invention discloses an eye state detecting method, applied to an electronic apparatus with an image sensor, which comprises: (a) acquiring a detecting image via the image sensor; (b) defining a face range on the detecting image; (c) defining a determining range on the face range; and (d) determining if the determining range comprises an open eye image or a close eye image.

Still another embodiment of the present invention discloses an eye state detecting system, comprising: a control circuit; an image sensor, wherein the control circuit controls the image sensor to capture a detecting range; and a computing circuit, configured to define a face range on the detecting image, to define a determining range on the face range, and to determine if the determining range comprises an open eye image or a close eye image.

In view of above-mentioned embodiments, the eye state for the user can be determined without detail image features and without an image having a large range, thus the issue for prior art that an image with a high resolution is needed for determining the eye state for the user and high power consumption due to large computing loading can be solved.

These and other objectives of the present invention will no doubt become obvious to those of ordinary skill in the art after reading the following detailed description of the preferred embodiment that is illustrated in the various figures and drawings.

DETAILED DESCRIPTION

In following descriptions, several embodiments are provided to explain the concept of the present invention. Please note, the devices in following embodiments, for example, the unit, the module or the system, can be implemented by hardware (ex. a circuit) or hardware with firm ware (ex. programs written to a microprocessor).

Figure 1:
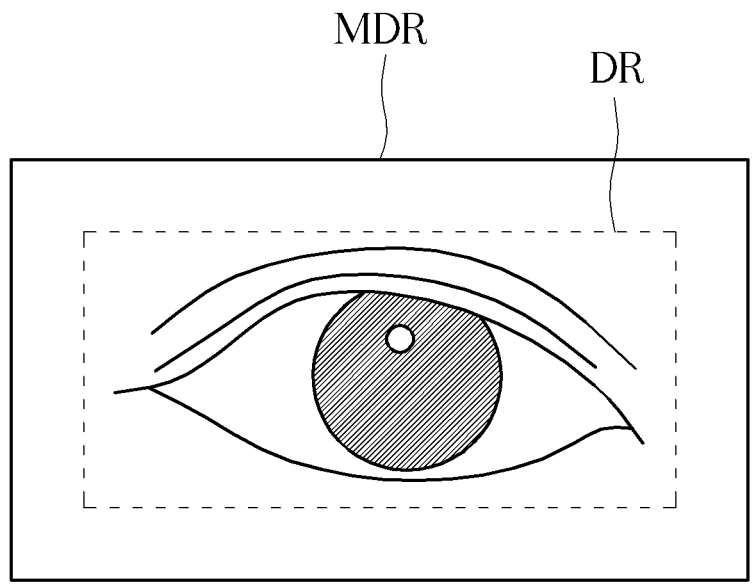
FIG. 1 is a schematic diagram illustrating an eye state detecting method according to one embodiment of the present invention.
Figure 1:
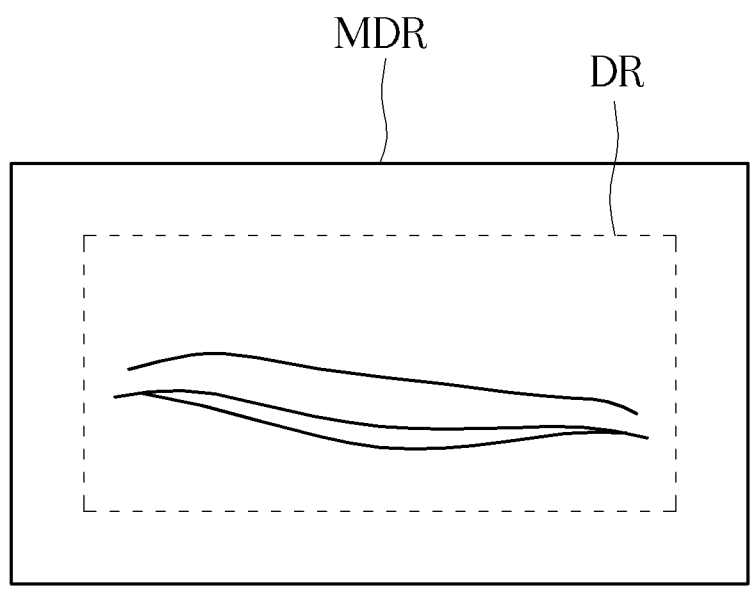

FIG. 1 is a schematic diagram illustrating an eye state detecting method according to one embodiment of the present invention. As illustrated in FIG. 1, the eye detecting method provided by the present invention applies a detecting range DR to capture a detecting image, and determines whether the user's eye is in an opening state or in a closing state according a brightness of to the detecting image. In one embodiment, an average brightness is applied to determine whether the user's eye is in the opening state or in the closing state. The average brightness is low if the user opens his eye, since the detecting image comprises an image of an eye. On the contrary, the average brightness is high if the user closes his eye, since a large part of the detecting image is an image of skin. Accordingly, the average brightness can be applied to determine whether the user's eye is in the opening state or in the closing state.

Figure 2:
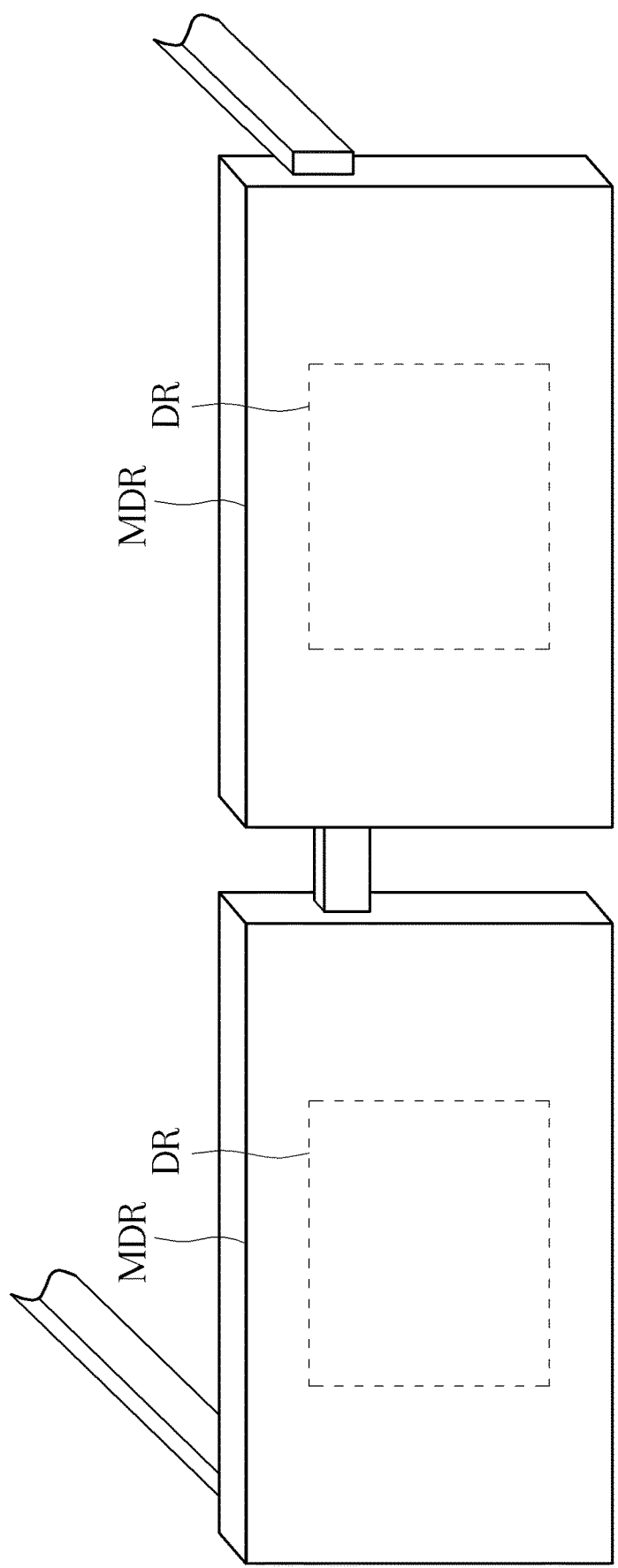
FIG. 2 is a schematic diagram illustrating that a smart glass applies the eye state detecting method in FIG. 1.

In this embodiment, the detecting range DR is smaller than a maximum detecting range MDR, and the location thereof is pre-defined. In one embodiment, the possible location for the user's eye is pre-defined, and the detecting range DR is decided based on the possible location. FIG. 2 is a schematic diagram illustrating that a smart glass applies the eye state detecting method in FIG. 1. Take FIG. 2 for example, the maximum detecting range MDR is a range that the glass contains. The eyes of the user always locate a central location if the user wears a smart glass, thus the central location can be applied as a basement to determine the detecting range DR. However, please note the embodiment illustrated in FIG. 1 is not limited to be applied to the smart glass illustrated in FIG. 2. The embodiment illustrated in FIG. 1 can be applied to other apparatuses, for example, a wearable apparatus for head, a display apparatus with a camera or a portable apparatus.

Figure 3:
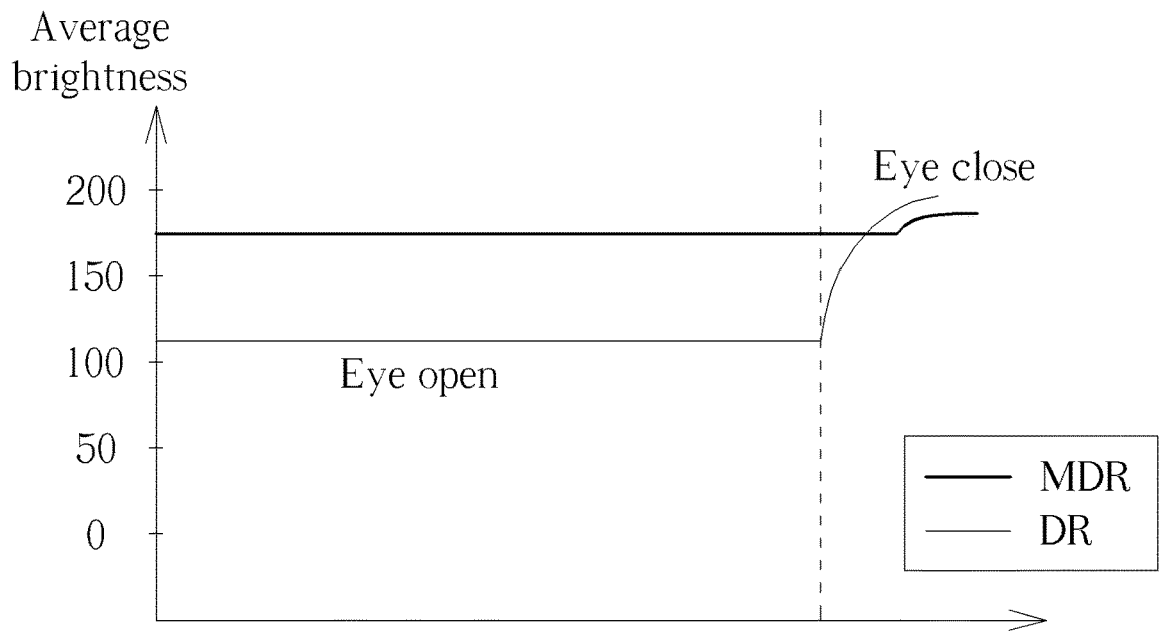
FIG. 3 is a schematic diagram illustrating the comparison between the brightness variation caused by the eye state detecting method illustrated in FIG. 1 and the brightness variation for prior art.

In the embodiment of FIG. 1, if the maximum detecting range MDR is applied to capture the detecting image rather than the detecting range DR, the computing data amount becomes large. Also, in such case the image for the eye only occupies a small part of the whole detecting image while the user opens his eye, thus the average brightness thereof is similar with the average brightness for the detecting image while the user closes his eye. Thereby it is hard to determine whether the user opens or closes his eye. As illustrated in FIG. 3, if the maximum detecting range MDR is applied to capture the detecting image, the average brightness for the detecting image while the user opens his eye and the average brightness for the detecting image while the user closes his eye are similar. On the opposite, if the detecting range DR smaller than the maximum detecting range MDR is applied, the average brightness for the detecting image while the user opens his eye and the average brightness for the detecting image while the user closes his eye have more significant difference.

Figure 4:
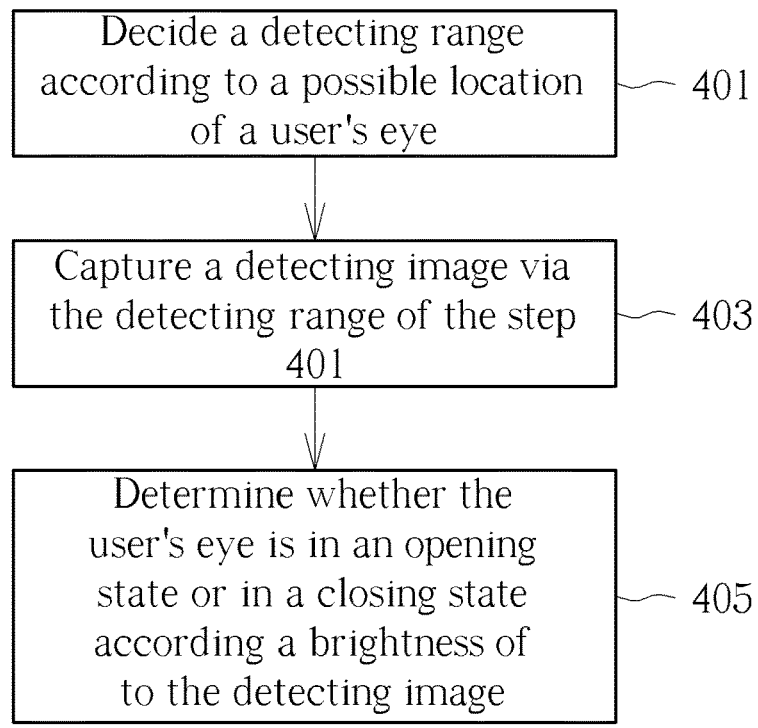
FIG. 4 is a flow chart illustrating an eye state detecting method according to one embodiment of the present invention.

FIG. 4 is a flow chart illustrating an eye state detecting method according to one embodiment of the present invention, which comprises following steps:

Step 401

Decide a detecting range according to a possible location of a user's eye. Take FIG. 2 for example, the user's eye may locate at a central location of a smart glass, thus the detecting range is decided based on the central location.

Step 403

Capture a detecting image via the detecting range of the step 401.

Step 405

Determine whether the user's eye is in an opening state or in a closing state according a brightness of to the detecting image.

Another embodiment of the present invention is disclosed as below, which determines whether the user's eye is in an opening state or in a closing state according a brightness variation tendency. One of the determining rule is: the darkest part for the image is always one part of the eye while the user opens his eye and the peripheral region for the darkest part is also one part of the eye, thus has a dark image as well. Accordingly, the brightness variation tendency for the peripheral region of the darkest part is gentle while the user opens his eye. On the opposite, the darkest part for the image is always a region that is not skin (ex. the eyelash) while the user closes his eye and the peripheral region for the darkest part is skin in such case. Accordingly, the peripheral region for the darkest part in this case has a brighter image. Therefore, the brightness variation tendency for the peripheral region of the darkest part is sharp while the user closes his eye. Please note, the following embodiments can be implemented with the embodiment illustrated in FIG. 1 to FIG. 4, that is, the smaller detecting range is applied to capture the detecting image.

Figure 5:
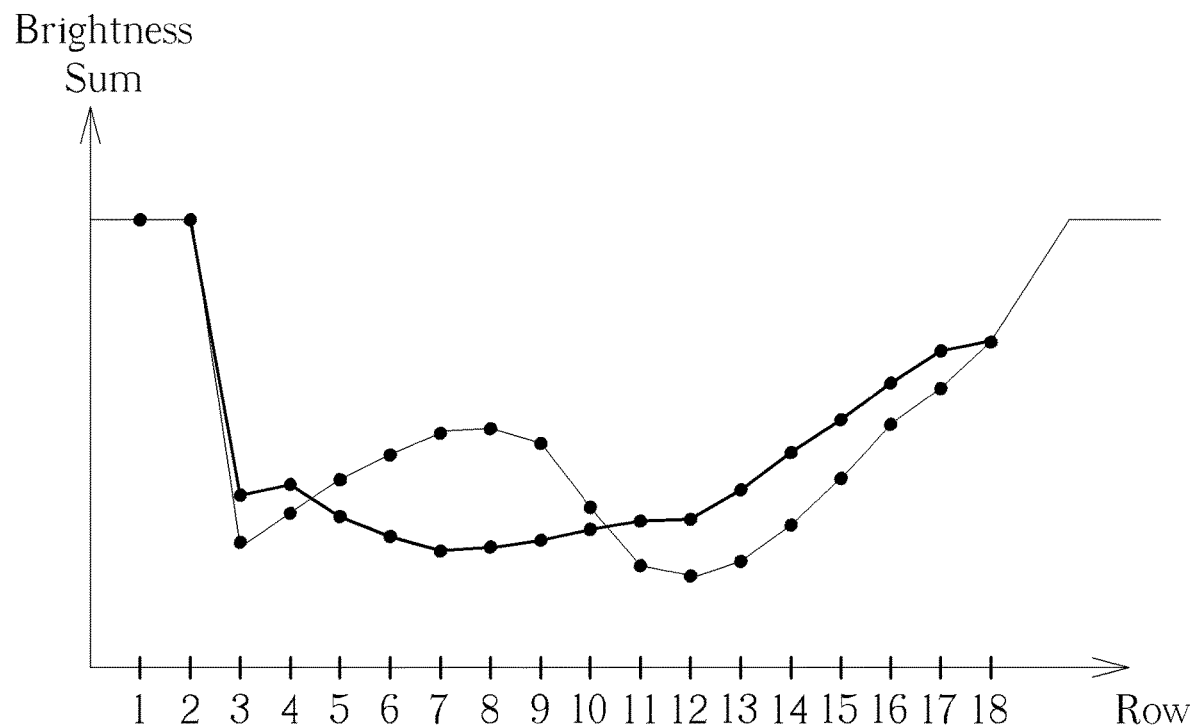
FIG. 5 is a schematic diagram illustrating an eye state detecting method according to another embodiment of the present invention.

FIG. 5 is a schematic diagram illustrating an eye state detecting method according to another embodiment of the present invention. In such embodiment, the brightness for each image row of the detecting image is summed and the image row with a lowest brightness is found. Take FIG. 5 for example, the image row with a lowest brightness is the seventh row while the user opens his eye and the image row with a lowest brightness is the twelfth row while the user closes his eye. According to FIG. 5, the variation for the sum of each image row's brightness is gentle while the user opens his eye. On the contrary, the variation for the sum of each image row's brightness is sharp while the user closes his eye. Many methods can be applied to acquire the brightness variation tendency. In one embodiment, the image row with a lowest brightness is selected as the standard image row, and a brightness sum difference between the brightness sum of the standard image line and brightness sums for at least two of the image lines are acquired. After that, the brightness variation tendency is decided according to the brightness sum difference.

In one embodiment, the standard image line is an N-th image line of the detecting image. In such case, brightness sum differences between the brightness sum of the standard image line and brightness sums for each one of image lines from an N+1-th image line to an N+K-th image line of the detecting image are computed. Furthermore, the brightness sum differences between the brightness sum of the standard image line and brightness sums for each one of image lines from an N−1-th image line to an N−K-th image line of the detecting image are computed. The K is a positive integer larger or equaling to 1.

Such embodiment will be explained via an example as below:

TABLE 1

| | Eye Open | Eye Close |
|---|---|---|
| a9 | 4035 | 4188 |
| a10 | 3514 | 4258 |
| a11 | 2813 | 4311 |
| a12 | 2542 | 4035 |
| a13 | 2669 | 3772 |
| a14 | 2645 | 3226 |
| a15 | 2835 | 2703 |
| a16 | 3154 | 2643 |

TABLE 1-continued

|     | Eye Open | Eye Close |
|-----|----------|-----------|
| a17 | 3564     | 2878      |
| a18 | 3888     | 3365      |
| a19 | 4142     | 3745      |

Table 1 illustrates brightness sums for different pixel rows while an eye is open and while an eye is close. The ax indicates the brightness sum for the x-th pixel row. For example, a9 indicates the brightness sum for the 9-th pixel row, and a15 indicates the brightness sum for the 15-th pixel row. In such example, the pixel row with a lowest brightness while the eye is open is the 12-th row, which has a brightness sum of 2542 (a12). If the above-mentioned K is 3, brightness sum differences between the brightness sum of the 12-th image row and brightness sums for each one of image rows from a 9-th image row to an 11-th image row of the detecting image are computed. Also, brightness sum differences between the brightness sum of the 12-th image row and brightness sums for each one of image rows from a 13-th image row to a 15-th image row of the detecting image are computed. Such operations are depicted in the Equation (1):

Equation (1): Eye Open

Brightness sum difference=(a9−a12)+(a10−a12)+
(a11−a12)+(a13−a12)+(a14−a12)+(a15−a12)

Similarly, the pixel row with a lowest brightness while the eye is close is the 16-th row, which has a brightness sum of 2643 (a16). If the above-mentioned K is 3, brightness sum differences between the brightness sum of the 16-th image row and brightness sums for each one of image rows from a 13-th image row to a 15-th image row of the detecting image are computed. Also, brightness sum differences between the brightness sum of the 12-th image row and brightness sums for each one of image rows from a 17-th image row to a 19-th image row of the detecting image are computed. Such operations are depicted in the Equation (2):

Equation (2): Eye Close

Brightness sum difference=(a13−a16)+(a14−a16)+
(a15−a16)+(a17−a16)+(a18−a16)+(a19−a16)

Based on Equation (1), the brightness sum difference while the eye is open is:
(4035−2542)+(3514−2542)+(2813−2542)+(2669−
2542)+(2645−2542)+(2 835−2542)=3259.

Based on Equation (2), the brightness sum difference while the eye is close is:
(3772−2643)+(3226−2643)+(2703−2643)+(2878−
2643)+(3365−2643)+(3 745−2643)=3831

The above-mentioned Equation (1) and Equation (2) can be regarded as a cost function. New cost functions can be acquired if the concept of absolute values is added to Equation (1) and (2), thereby Equation (3) and (4) are acquired.

Equation (3): Eye Open

Brightness sum difference=|a9−a10|+|a10−a11|+
|a11−a12|+|a13−a12|+|a14−a13|+|a15−a14|

Equation (4): Eye Close

Brightness sum difference=|a13−a14|+|a14−a15|+
|a15−a16|+|a17−a16|+|a18−a17|+|a19−a18|

Based on Equation (3), the brightness sum difference while the eye is open is:
|4035−3514|+|3514−2813|+|2813−2542|+|2669−2542|+
|2669−2645|+|2835−2645|=1834

Based on Equation (4), the brightness sum difference while the eye is close is:
|3772−3226|+|3226−2703|+|2703−2643|+|2878−2643|+
|3365−2878|+|3745−3365|=2231

In view of above-mentioned examples, the brightness sum difference while the eye is close is larger than the brightness sum difference while the eye is open. That is, the brightness for a peripheral part for the darkest part of the detecting image while the eye is close varies more sharply than the brightness for a peripheral part for the darkest part of the detecting image while the eye is open. Therefore, the brightness variation for a peripheral part for the darkest part of the detecting image can be applied to determine if the user's is in an opening state or in a closing state.

Figure 6:
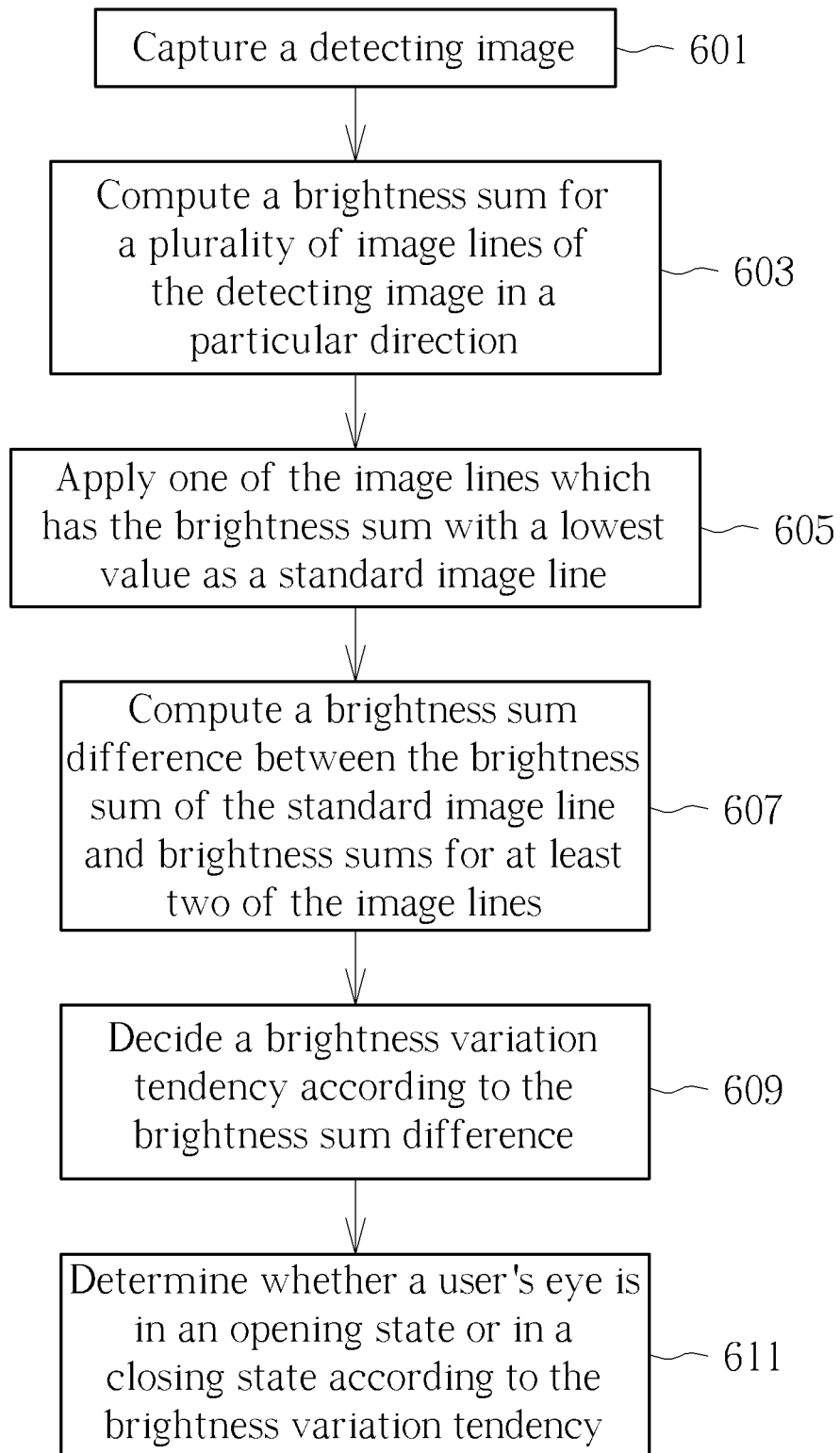
FIG. 6 is a flow chart illustrating the eye state detecting method depicted in FIG. 5.

Please note although the pixel row is applied as an example to explain the embodiment in FIG. 5, the pixel column can be applied to compute the brightness variation tendency as well. Therefore, an eye state detecting method can be acquired based on the embodiment of FIG. 5, which comprises the steps illustrated in FIG. 6 as below:

Step 601

Capture a detecting image. Such step can apply the detecting range in FIG. 1 to capture the image, but not limited.

Step 603

Compute a brightness sum for a plurality of image lines of the detecting image in a particular direction. For example, pixel rows or pixel columns.

Step 605

Apply one of the image lines which has the brightness sum with a lowest value as a standard image line.

Step 607

Compute a brightness sum difference between the brightness sum of the standard image line and brightness sums for at least two of the image lines.

Step 609

Decide a brightness variation tendency according to the brightness sum difference Step 611

Determine whether a user's eye is in an opening state or in a closing state according to the brightness variation tendency Please note the above-mentioned steps 603-609 can be combined to form a step of "compute a brightness variation tendency for a peripheral part of a darkest part of the detecting image". However, such step can be formed by other steps rather than steps 603-609.

Figure 7:
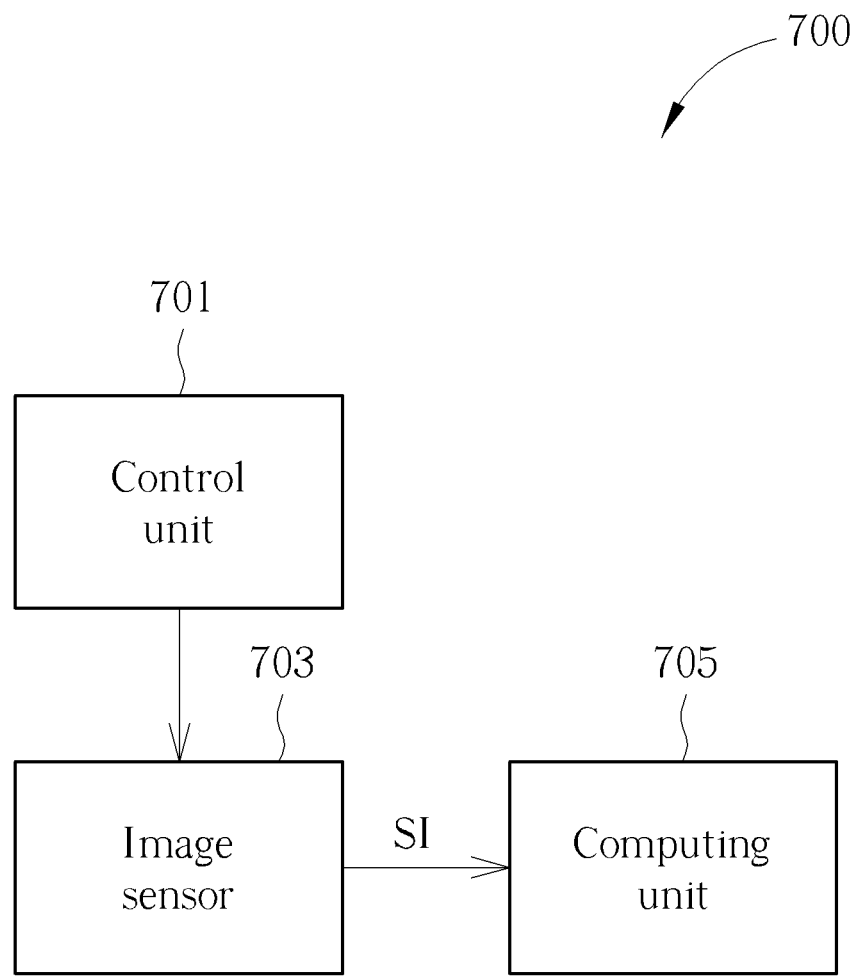
FIG. 7 is a block diagram illustrating an image detecting apparatus according to one embodiment of the present invention.

FIG. 7 is a block diagram illustrating an image detecting apparatus according to one embodiment of the present invention. As illustrated in FIG. 7, the eye state detecting system 700 comprises a control unit 701, an image sensor 703 and a computing unit 705. The control unit 701 and the computing unit 705 can be integrated to a single device. If the eye state detecting system 700 implements the embodiment illustrated in FIG. 1, the control unit 701 controls the image sensor 703 to capture a detecting image SI via a detecting range. The detecting range is defined according to a possible location of a user's eye, and is smaller than a maximum detecting range that the electronic apparatus can apply. The computing unit 705 computes a brightness of the detecting image SI, and determines whether the user's eye is in an opening state or in a closing state according to the detecting image SI.

If the eye state detecting system 700 applies the embodiment illustrated in FIG. 5, the control unit 701 controls the image sensor 703 to capture a detecting image SI via a detecting range. The computing unit 705 computes a brightness variation tendency for a peripheral part of a darkest part of the detecting image SI, and determines whether the user's eye is in an opening state or in a closing state according to the brightness variation tendency.

Other operations for the eye state detecting system 700 are described in above-mentioned embodiments, thus are omitted for brevity here.

The above-mentioned embodiments firstly decide a detecting range according to a possible location of a user's eye, and then determine whether the user's eye is in an opening state or in a closing state according to a brightness variation tendency of the image. In following embodiments, the face range is firstly determined, and then a searching range on the face range is decided. After that, determine whether the user's eye is in an opening state or in a closing state according to the image in the determining range. Detail steps will be explained in following descriptions.

Figure 8:
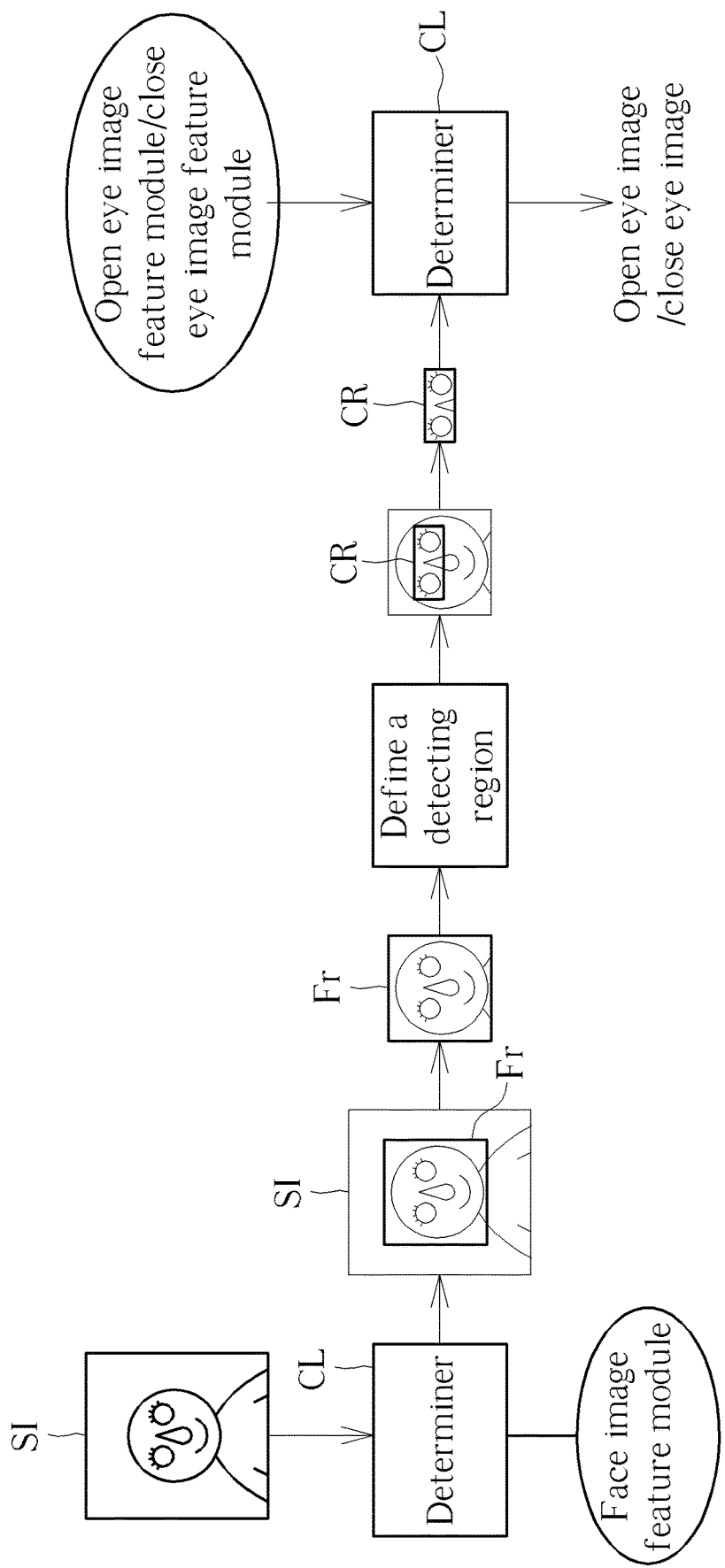
FIG. 8 is a schematic diagram illustrating an eye state detecting method according to another embodiment of the present invention.

Please refer to FIG. 8, which is a schematic diagram illustrating an eye state detecting method according to another embodiment of the present invention. As illustrated in FIG. 8, a determiner CL (or named a classifier) is configured to process the detecting image SI captured by the image sensor. Such determiner CL determines if the detecting image SI comprises a face image based on a pre-set face image feature module. If the detecting image SI comprises a face image, a face range Fr is defined in the detecting image SI. After that, a determining range CR is defined in the face range Fr. In one embodiment, such determining range CR is smaller than the face range Fr (but can be equal to the face range Fr). Next, the determiner CL computes whether the determining range CR comprises an open eye image or a close eye image according to an open eye image feature module or a close eye image feature module.

The above-mentioned embodiment applies a smaller determining range CR and the computing for a whole image is not needed, such that the computing loading can be decreased. In one embodiment, if it is determined that the detecting image SI does not comprise a face image, the step for defining the determining range CR and the step for computing if the determining range CR comprises an open eye image or a close eye image can be removed. By this way, the computing loading can be further decreased. Various methods can be applied to define the determining range CR. In one embodiment (but not limited), a possible location for the eye is determined, and then the determining range CR is defined according to the possible location.

Figure 9:
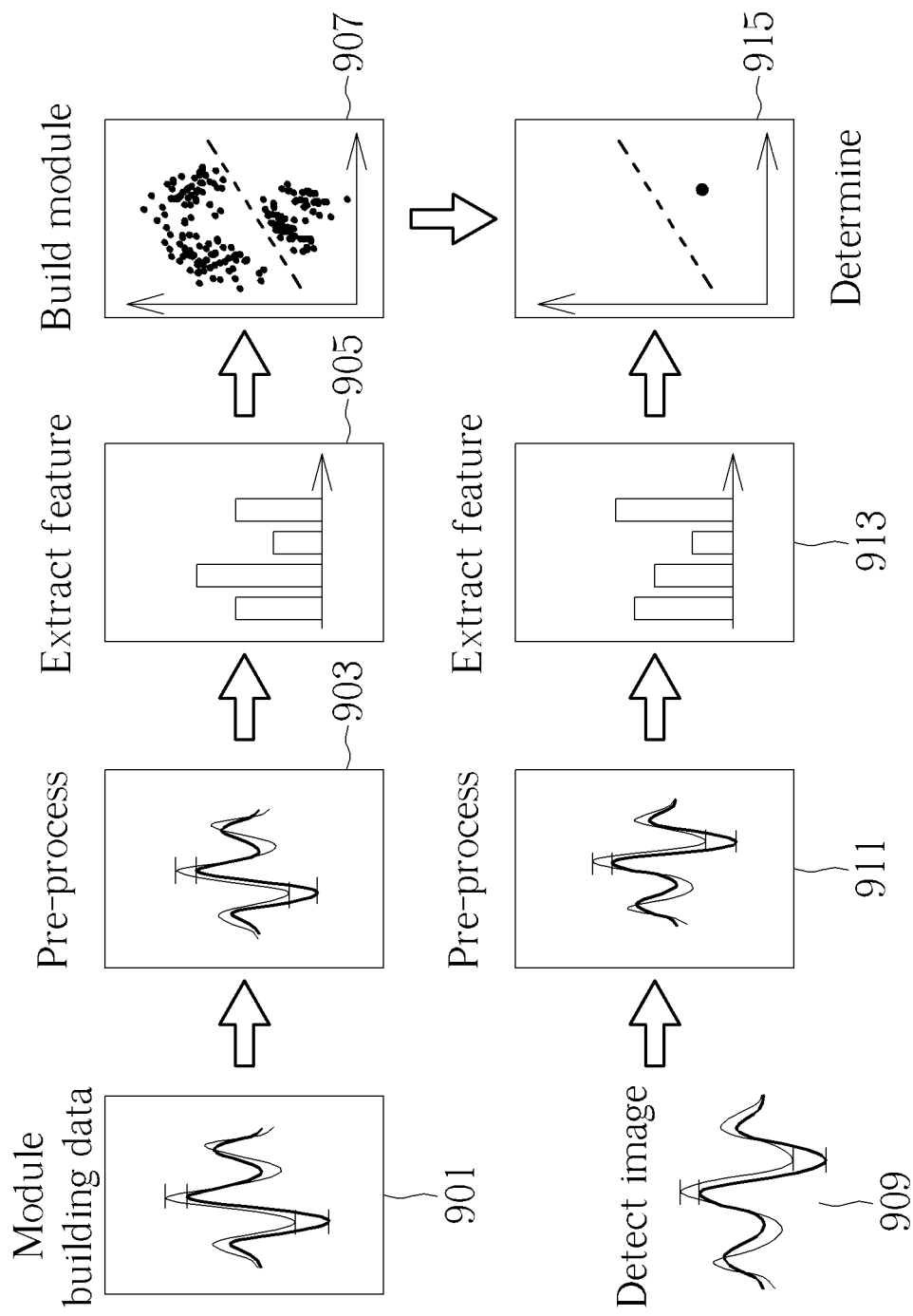
FIG. 9 is a schematic diagram illustrating detail steps for the embodiment illustrated in FIG. 8.

FIG. 9 is a schematic diagram illustrating detail steps for the embodiment illustrated in FIG. 8. In the step 901, a determining module is generated based on module building data. For example, at least one image comprising the face image can be provided to build the face image feature module as the determining module. Alternatively, at least one image comprising an open eye image is provided to build the open eye image feature module as the determining module. Similarly, at least one image comprising the close eye image can be provided to build the close eye image feature module as the determining module. The step 903 is applied to pre-process the module building data, for example, adjusting the brightness or the contrast to make following steps easier. However, the step 903 is removed in another embodiment.

Also, the step 905 extracts features from the module building data, and the step 907 builds the module corresponding to the features extracted in the step 905. For example, at least one image comprising the face image is input in the step 901. Also, the step 905 extracts features for the face image, and the step 907 builds a face image feature module corresponding to the face image features extracted in the step 905. By this way, it can be known that which features should exist if an image comprises a face image. Besides, in the step 907, the detecting image to be determined is input. The step 911 performs a pre-process similar with the step 903. The step 913 extracts features from the detecting image. The step 915 determines if the detecting image comprises a face image, an open eye image or a close eye image according to which one of the determining modules do features of the detecting image meet. After that, it can be determined that if the detecting image comprises a face image, an open eye image or a close eye image.

Various conventional algorithms can be applied to perform the step 905 or the step 913 to extract features of images, for example, the gabor algorithm or the harr algorithm. Similarly, various conventional algorithms can be applied to determine which one of the determining modules does the detecting image meet (i.e. classify the detecting image), for example, the adaboost algorithm. It will be appreciated that the present invention is not limited to above-mentioned algorithms.

The embodiments illustrated in FIG. 8 and FIG. 9 can be performed by the eye state detecting system 700 illustrated in FIG. 7. As above-mentioned, the eye state detecting system 700 comprises a control unit 701, an image sensor 703 and a computing unit 705. The control unit 701 and the computing unit 705 can be integrated to a single device. If the eye state detecting system 700 performs the embodiments illustrated in FIG. 8 and FIG. 9, the control unit 701 controls the image sensor 703 to capture a detecting image SI. The computing unit 705 determines the determining range (ex. CR in FIG. 8) in the detecting image SI utilizing the embodiments illustrated in FIG. 8 or FIG. 9, and determines if the detecting image SI comprises an open eye image or a close eye image according to images in the determining range CR. After that, the user is accordingly determined if his eye is in an opening state or a closing state.

Figure 10:
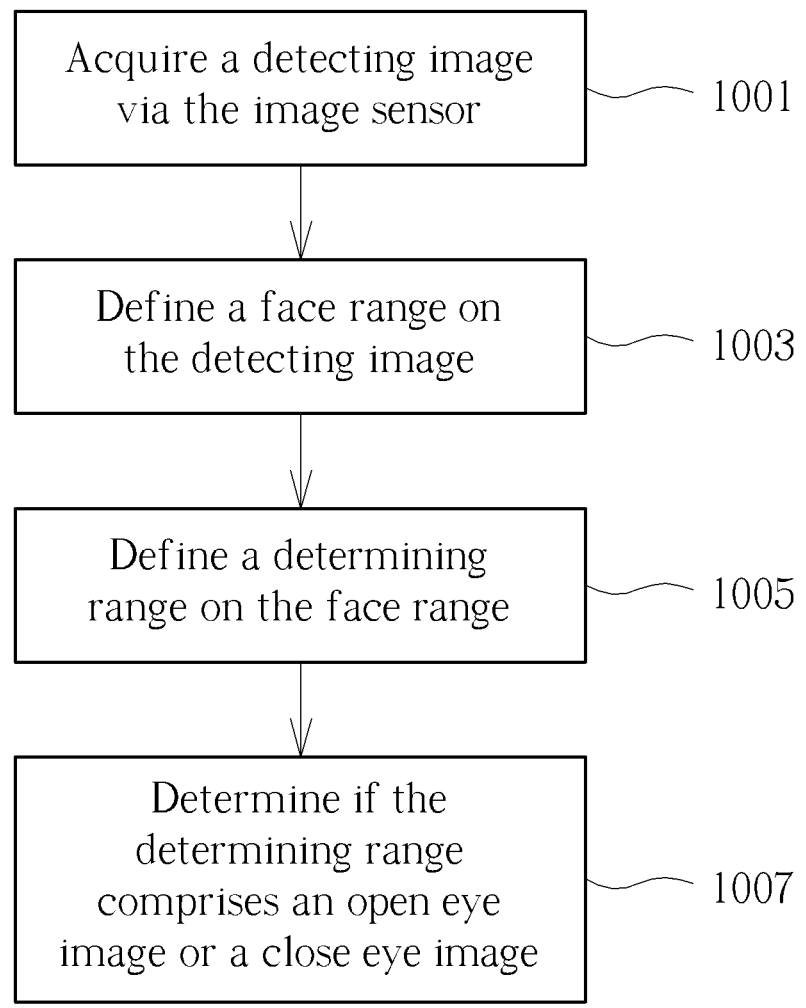
FIG. 10 is a flow chart illustrating an eye state detecting method provided by the present invention.

Based upon the embodiments illustrated in FIG. 8 and FIG. 9, the eye state detecting method provided by the present invention can be summarized as FIG. 10, which comprises following steps:

Step 1001

Acquire a detecting image via the image sensor (ex. SI in FIG. 8).

Step 1003

Define a face range on the detecting image (ex. Fr in FIG. 8).

Step 1005

Define a determining range on the face range (ex. CR in FIG. 8).

Step 1007

Determine if the determining range comprises an open eye image or a close eye image.

In one embodiment, the methods illustrated in FIG. 8-FIG. 10 are applied to non-wearable electronic apparatus. For example, a hand held mobile apparatus such as a mobile phone or a tablet computer, or an electronic apparatus such as a laptop, which can be put on a flat, can be implemented as the non-wearable electronic apparatus (but not limited).

In view of above-mentioned embodiments, the eye state for the user can be determined without detail image features and without an image having a large range, thus the issue for prior art that an image with a high resolution is needed for determining the eye state for the user and high power consumption due to large computing loading can be solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An eye state detecting method, comprising:
   (a) capturing a detecting image;
   (b) computing a brightness variation tendency for a peripheral part of a darkest part of the detecting image; and
   (c) determining whether a user's eye is in an opening state or in a closing state according to the brightness variation tendency;
   wherein the step (b) further comprises:
   (b1) computing a brightness sum for a plurality of image lines of the detecting image in a particular direction;
   (b2) applying one of the image lines which has the brightness sum with a lowest value as a standard image line;
   (b3) computing brightness sum differences between the brightness sum of the standard image line and brightness sums for at least two of the image lines; and
   (b4) deciding the brightness variation tendency according to the brightness sum differences.

2. The eye state detecting method of claim 1, wherein the image lines are image rows.

3. The eye state detecting method of claim 1,
   wherein the standard image line is a N-th image line of the detecting image;
   wherein the step (b3) computes brightness sum differences between the brightness sum of the standard image line and brightness sums for each one of image lines from a N+1-th image line to a N+K-th image line of the detecting image, and computes brightness sum differences between the brightness sum of the standard image line and brightness sums for each one of image lines from a N−1-th image line to a N−K-th image line of the detecting image;
   wherein the K is a positive integer larger or equaling to 1.

4. An eye state detecting system, comprising:
   a control circuit;
   an image sensor, wherein the control circuit controls the image sensor to capture a detecting image via a detecting range; and
   a computing circuit, configured to compute a brightness variation tendency for a peripheral part of a darkest part of the detecting image, and to determine whether the user's eye is in an opening state or in a closing state according to the brightness variation tendency;
   wherein the computing circuit performs following steps to compute the brightness variation tendency:
   computing a brightness sum for a plurality of image lines of the detecting image in a particular direction;
   applying one of the image lines which has the brightness sum with a lowest value as a standard image line;
   computing brightness sum differences between the brightness sum of the standard image line and brightness sums for at least two of the image lines; and
   deciding the brightness variation tendency according to the brightness sum differences.

5. The eye state detecting system of claim 4, wherein the image lines are image rows.

6. The eye state detecting system of claim 4,
   wherein the standard image line is a N-th image line of the detecting image;
   wherein the computing circuit computes brightness sum differences between the brightness sum of the standard image line and brightness sums for each one of image lines from a N+1-th image line to a N+K-th image line of the detecting image, and computes brightness sum differences between the brightness sum of the standard image line and brightness sums for each one of image lines from a N−1-th image line to a N−K-th image line of the detecting image;
   wherein the K is a positive integer larger or equaling to 1.

\* \* \* \* \*